(No Model.) 9 Sheets—Sheet 1.
H. B. COOLEY, J. M. NOBLE & J. E. TREVOR.
COUNTER FOR ENVELOPE MACHINES.

No. 541,656. Patented June 25, 1895.

Fig. 1.

Witnesses:
J. B. McGirr.
Albert Popkins.

Inventors:
H. B. Cooley
J. M. Noble
J. E. Trevor
By Howson & Howson
their Attys (No Model.) 9 Sheets—Sheet 2.

H. B. COOLEY, J. M. NOBLE & J. E. TREVOR.
COUNTER FOR ENVELOPE MACHINES.

No. 541,656. Patented June 25, 1895.

(No Model.) 9 Sheets—Sheet 3.
H. B. COOLEY, J. M. NOBLE & J. E. TREVOR.
COUNTER FOR ENVELOPE MACHINES.

No. 541,656. Patented June 25, 1895.

(No Model.) 9 Sheets—Sheet 4.

H. B. COOLEY, J. M. NOBLE & J. E. TREVOR.
COUNTER FOR ENVELOPE MACHINES.

No. 541,656. Patented June 25, 1895.

Fig. 4.

Witnesses:

Inventors:

(No Model.) 9 Sheets—Sheet 5.

H. B. COOLEY, J. M. NOBLE & J. E. TREVOR.
COUNTER FOR ENVELOPE MACHINES.

No. 541,656. Patented June 25, 1895.

Witnesses:

Inventors:
H. B. Cooley
J. M. Noble
J. E. Trevor (No Model.) 9 Sheets—Sheet 6.

H. B. COOLEY, J. M. NOBLE & J. E. TREVOR.
COUNTER FOR ENVELOPE MACHINES.

No. 541,656. Patented June 25, 1895.

Witnesses:
J. B. McGirr.
Albert Popkins

Inventor
H. B. Cooley
J. M. Noble
J. E. Trevor
By Howson & Howson
their Attys.

THE NORRIS PETERS CO., PHOTO-LITHO., WASHINGTON, D. C.

(No Model.) 9 Sheets—Sheet 8.

H. B. COOLEY, J. M. NOBLE & J. E. TREVOR.
COUNTER FOR ENVELOPE MACHINES.

No. 541,656. Patented June 25, 1895.

Witnesses:
J. B. McGirr.
Albert Popkins.

Inventors:
H. B. Cooley,
J. M. Noble,
J. E. Trevor,
By Howson & Howson
their attys

THE NORRIS PETERS CO., PHOTO-LITHO., WASHINGTON, D. C.

(No Model.) 9 Sheets—Sheet 9.

H. B. COOLEY, J. M. NOBLE & J. E. TREVOR.
COUNTER FOR ENVELOPE MACHINES.

No. 541,656. Patented June 25, 1895.

UNITED STATES PATENT OFFICE.

HENRY BUCKLEY COOLEY, JOHN MADISON NOBLE, AND JAMES EDWARD TREVOR, OF HARTFORD, CONNECTICUT.

COUNTER FOR ENVELOPE-MACHINES.

SPECIFICATION forming part of Letters Patent No. 541,656, dated June 25, 1895.

Application filed March 18, 1895. Serial No. 542,223. (No model.)

*To all whom it may concern:*

Be it known that we, HENRY BUCKLEY COOLEY and JOHN MADISON NOBLE, citizens of the United States, and JAMES EDWARD TREVOR, a subject of the Queen of Great Britain and Ireland, residing at Hartford, in the county of Hartford and State of Connecticut, have invented certain new and useful Improvements in Counters for Envelope-Machines, of which the following is a specification.

Our invention relates to counters for envelope and analogous machines and our objects are to make a counter for such machines which will, first, accurately and unvaryingly count the envelopes as they are received from the machine to which our mechanism is attached and, second, to count only as each envelope is received so that when, from any cause, an envelope should not be received by it no count will be made; and our further object is to provide a chain in connection with our counter which will remain stationary while a predetermined number of envelopes is being placed upon it and will be automatically moved step by step, as each bundle or package of envelopes is completed and, in general, we aim to provide such a counter and chain in connection therewith as will be particularly adapted to envelope machines, or analogous structures, having a bottom delivery.

To this end, our invention consists in mechanism for receiving the envelopes from the machine and counting the same as they are received; and mechanism for pushing the envelopes successively upon the delivery chain; and mechanism for packing and holding the same in position thereon; and mechanism for automatically moving the chain one section at a time, upon the completion of each bundle or package of envelopes, and in general and specific details entering into these mechanisms, for accomplishing the purposes set forth.

Referring now to the drawings in which the same characters refer to the same or corresponding parts throughout all the views, 1, indicates the frame of the machine to which are secured, by suitable means, the side frames, 4, for supporting the counter mechanism. These frames, 4 are connected by two cross bars or pieces, 5 and 6, the whole constituting a supplemental frame and supporting structure for the various rolls, gearing, &c., as hereinafter more particularly described. This structure is, of course, attached to the frame, 1, of the machine at a suitable point below the delivery mechanism of the machine, which is supported upon a table, not shown in the drawings, on top of the frame, 1.

Figure 1:
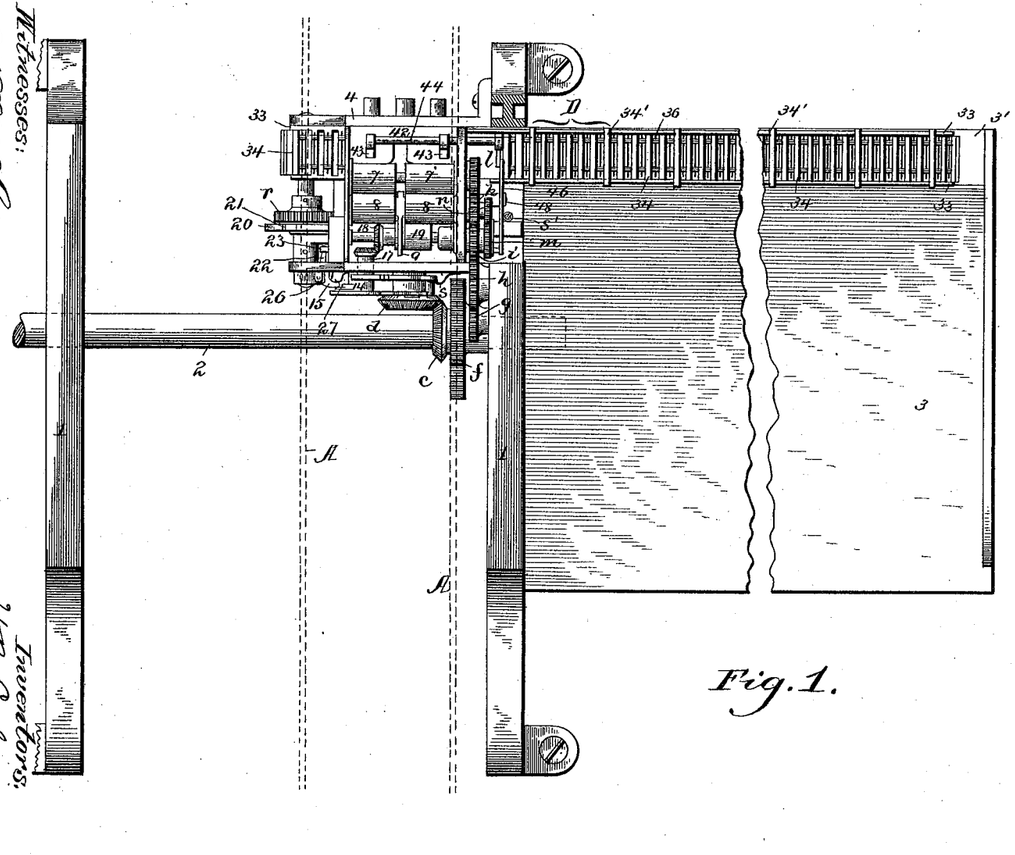
Figure 1 is a top plan view of our invention applied to an envelope-machine, showing its relation thereto.

The dotted lines, Fig. 1, indicated by the letter, A, represent the direction in which the drying chain, or other mechanism, travels and is not illustrated in this application inasmuch as it is only necessary to understand that the counting mechanism is to be attached to the frame of the machine at such points below the delivery of the machine as to properly receive the envelopes as they are discharged therefrom; and in the present application of the invention, it is illustrated as applied to a machine which has a bottom delivery such, for example, as that disclosed in our prior application, Serial No. 533,347, filed December 29, 1894.

Figures 3, 25:
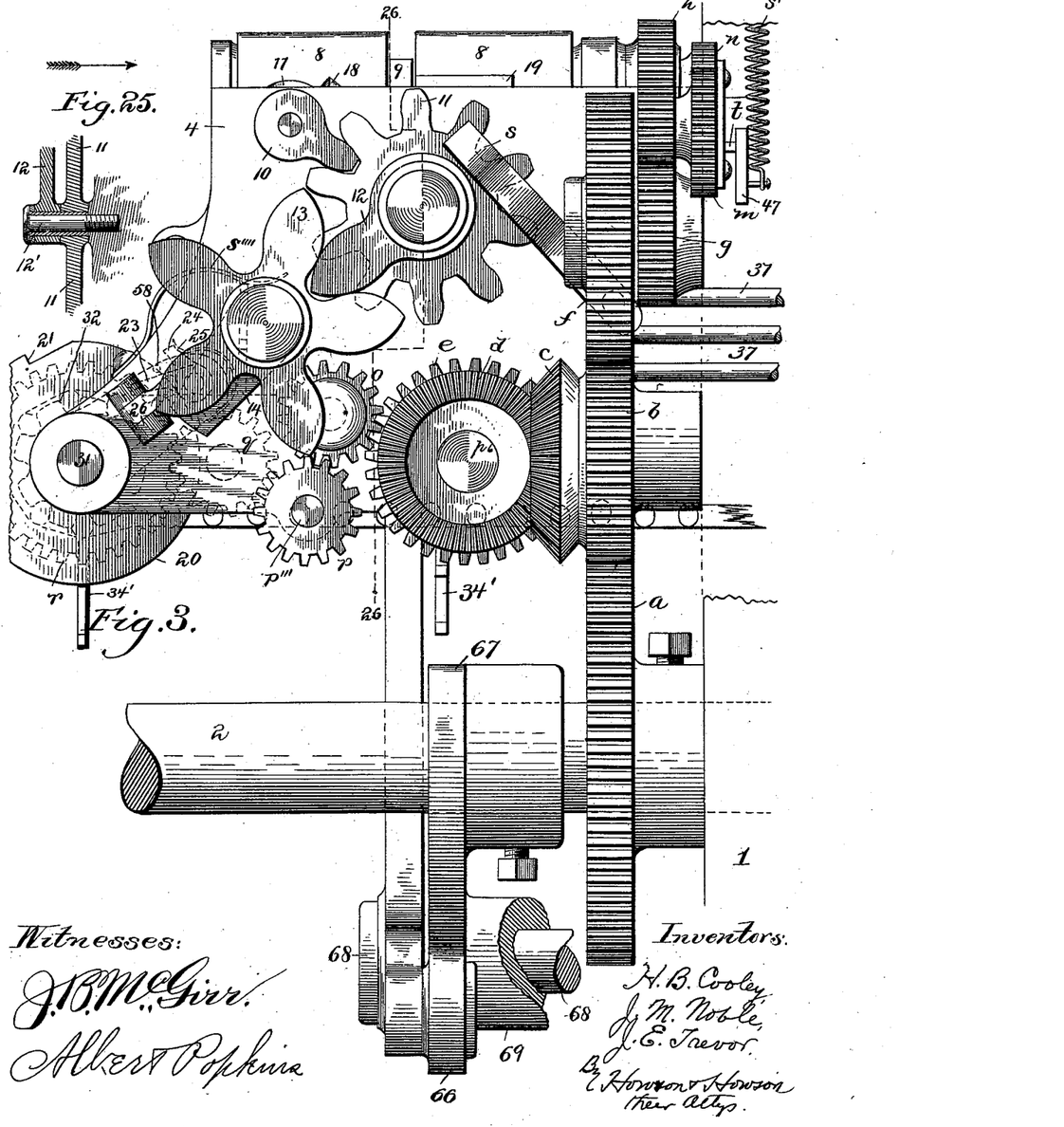
Fig. 3 is a side elevation of our invention, looking in the direction of the arrow, Fig. 4.
Fig. 25 is a sectional detail showing the manner of mounting the counter gears.

The receiving rolls, 7 and 8, are suitably journaled in the cross bars, 5 and 6, in their respective bearings, $l'$ and $k'$. These rolls are made in two parts mounted upon their shafts, leaving a space between the two parts for the pawl, 9, which is journaled upon the shaft of the roll, 8. Upon a shaft supported in bearings, $m'$, in the bars, 5 and 6, adjacent to the rolls, 8, is a roll, 19 rigidly fixed to its shaft so as to rotate continuously therewith. Upon this same shaft is loosely mounted a beveled gear, 18, with an elongated hub having its face in loose contact with the roll, 19 and provided on the flange thereof with a ratchet tooth, $18^c$. Meshing with the gear, 18, is another bevel gear, 17, journaled in the frame, 4, and provided on its outer end with a one tooth gear, 10, which meshes with a ten tooth gear, 11, upon whose bushing is mounted a second single tooth gear, 12, meshing with a five tooth gear, 13, as shown clearly in Figs. 3 and 25. By this arrangement, it will be seen that one revolution of the bevel gear, 17, with its one tooth gear, 10, will cause the gear, 11, to move one tooth and one revolution of the gear, 11, will be equivalent to ten revolutions of the gear, 10, and one revolution of the gear, 11, through the one tooth gear, 12, mounted on the same bushing therewith, will move the gear, 13, one tooth; and one revolution of the latter consequently requires five revolutions of the gear, 11, and fifty revolutions of the gear, 10. It will thus be seen that when the gear, 10, is caused to make a single revolution at each time an envelope is received by and passed between the rolls, 7 and 8, the passage of fifty envelopes between the rolls will cause, through the intervening gears just described, the gear, 13, to make one complete revolution. Of course, any other number may be selected, if desired, fifty being selected in the present instance merely as an illustration, as it is a common number of envelopes forming a pack.

Pressing upon the face of the gear, 11, is a leaf spring, $s$, the object of which is to prevent the gear, 10, from moving the gear, 11, more than one tooth at a time by the momentum given to it as it turns the said gear, the spring serving by its pressure on the face of the gear to hold the latter in the position in which the tooth, 10, leaves it. The spring, $s''''$ presses upon the hub of the gear, 13, and serves a similar purpose with respect to that gear and its driving gear, 12.

Figure 4:
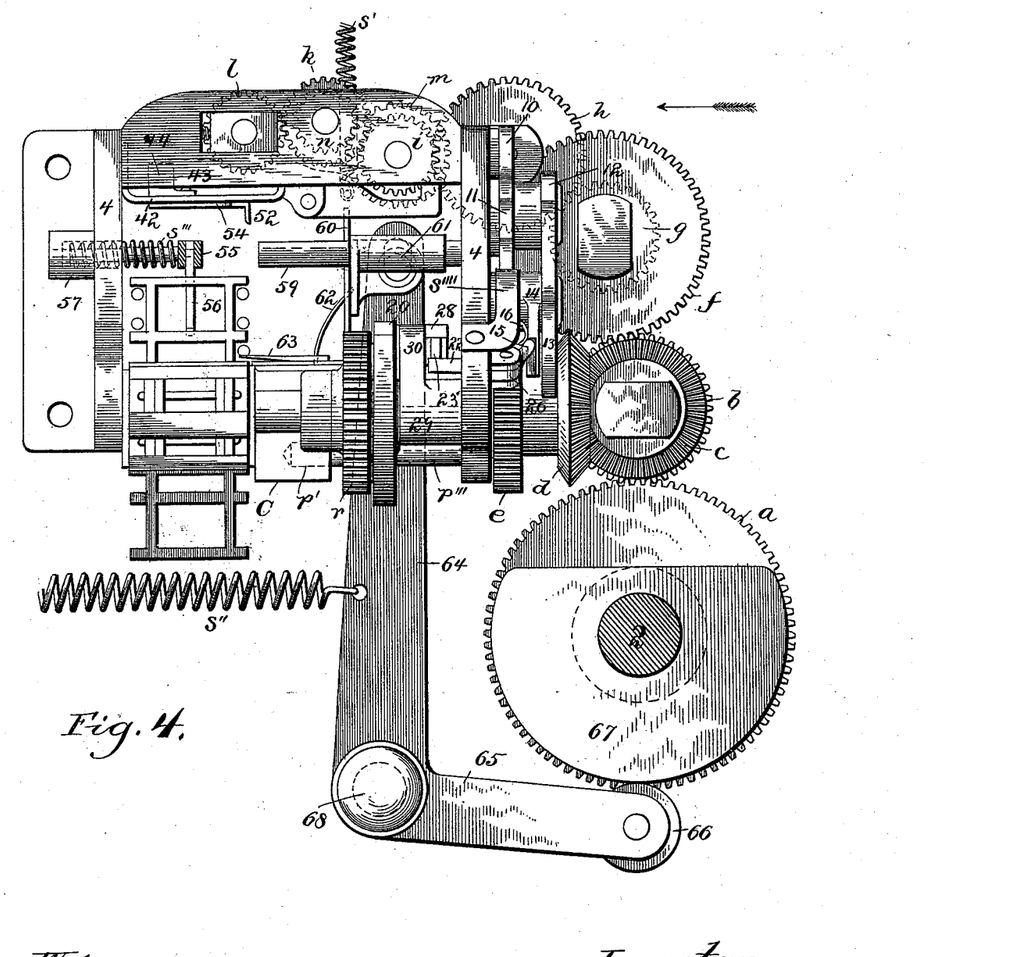
Fig. 4 is an end elevation looking in the direction of the arrow, Fig. 3.
Figure 20:
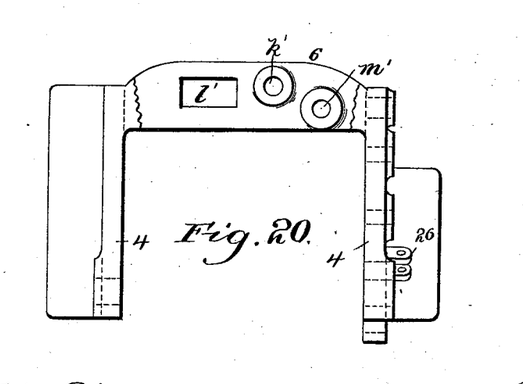
Figs. 20 to 22 are details of the supporting frames.
Figures 21, 22, 23:
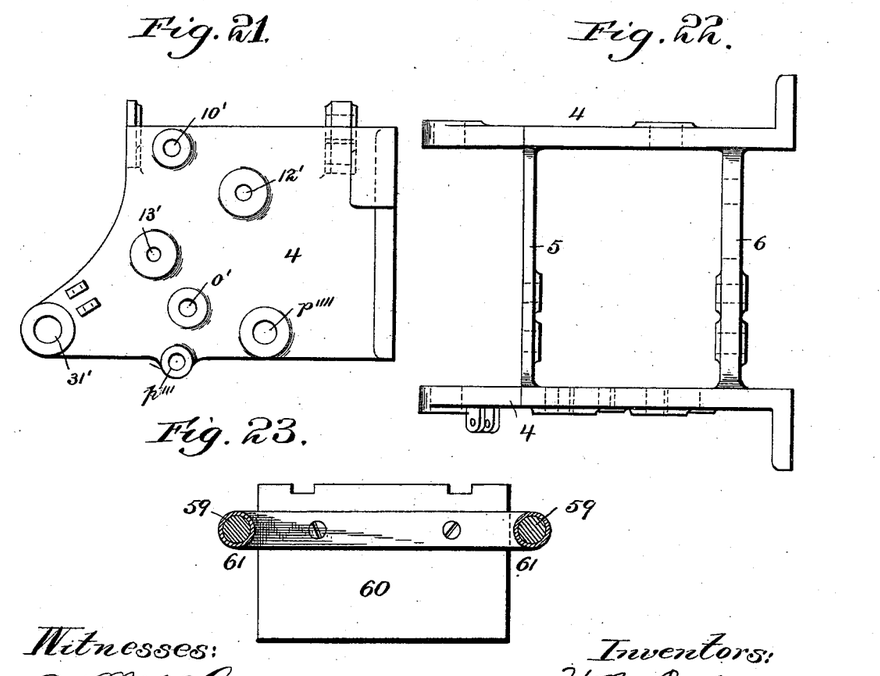
Fig. 23 is a front view of the packer or pusher head.
Figure 26:
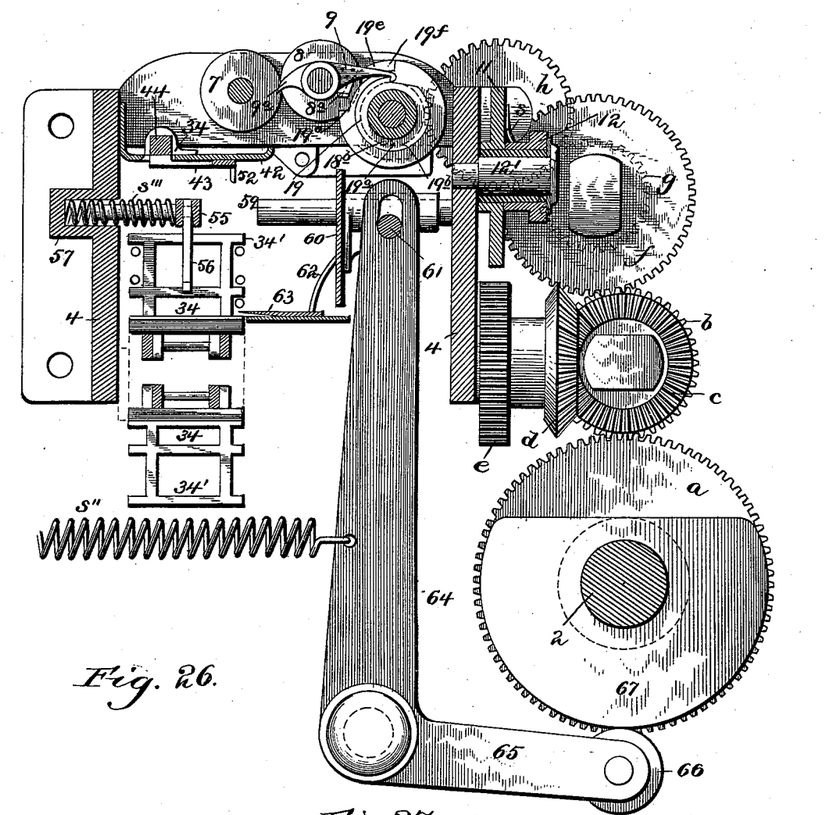
Fig. 26 is a vertical sectional view on the line 26 26, Fig. 3, looking in the direction of the arrow.
Figure 27:
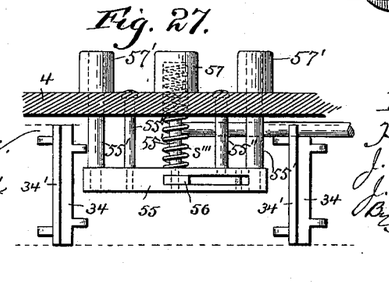
Fig. 27 is a detail in plan of the buffer.

As shown in Figs. 20 to 22, inclusive, the frames, 4, are provided with suitable studs, $10'$ and $12'$ and journal bearings, $13'$, $o'$, $p'''$, $p''''$ and $31'$ forming bearings for the hubs or bushings of the gears 10, 12, 13, $o$, and $p^6$, and shafts $p$ and 31, respectively, and that the cross bars, 5 and 6, connecting the two frames, 4, are provided with bearings, $l'$, $k'$, $m'$, for the shafts of the rolls 7, 8, and 19, upon which shafts are carried the gears, $l$, $k$, $m$, respectively, the former bearing, $l'$, being preferably slotted so as to receive a compensating or spring actuated journal, as shown in Fig. 4.

The frames, 4, may be attached to the main frame, 1, of the machine, by any suitable means such as flanges and securing bolts, illustrated in the drawings.

The rolls, 7, 8, and 19, as before stated, rotate continuously with their shafts, upon the outer ends of which are the intermeshing gears, $l$, $k$, $i$, of equal diameters, respectively, which receive their motion from the main shaft through the train of gears, $a$, $b$, $f$, $g$, $h$, $i$, $k$ and $l$, in the order named, the gear, $a$, being rigidly secured to the driving shaft, 2, of the machine, the receiving rolls, 7 and 8, being timed to make two or more revolutions to one revolution of the roll, 19. The gear, $i$, is mounted loosely upon its shaft and drives the gear, $k$, while the gear, $n$, upon the shaft of the roll, 8, drives the gear, $m$, and through it, the roll, 19, both $m$ and $n$, being fixed to their shafts.

Figures 2, 24:
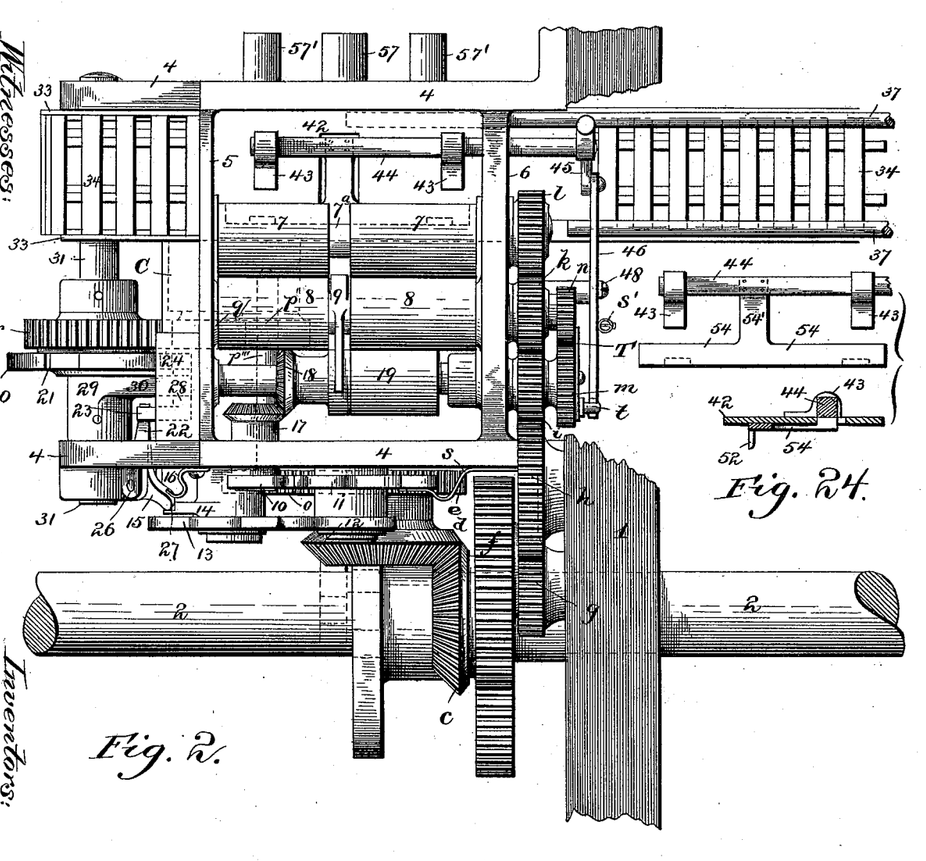
Fig. 2 is an enlarged top plan view of the same.
Fig. 24, a detail, in top plan and vertical sectional views, of the shaft and fingers carried thereby for retaining the envelopes on edge in the chain.
Figures 5, 6, 7:
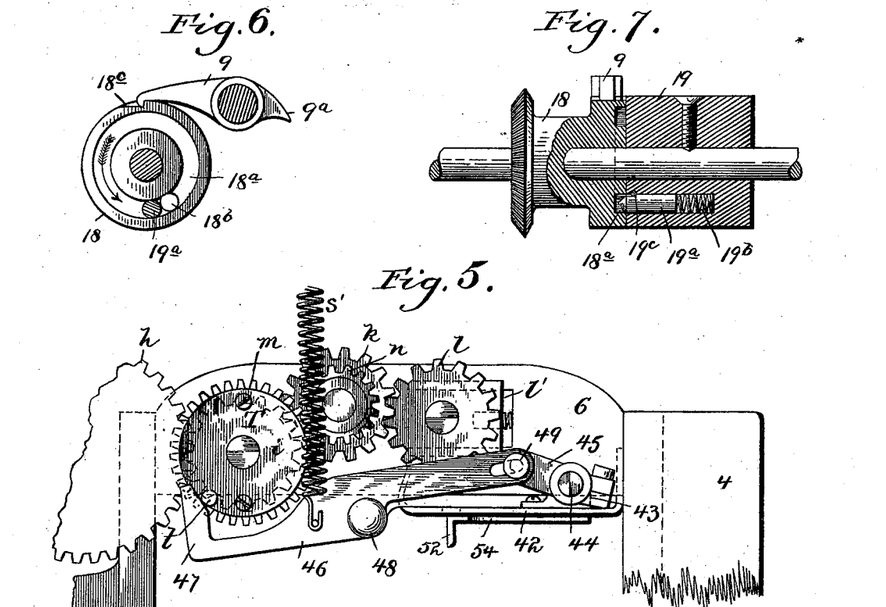
Fig. 5 is an end elevation of a detached portion opposite to that shown in Fig. 4.
Figs. 6 and 7 are details of the pawl mechanism.

In order that the mechanism by which the counter train is operated may cause the same to make the proper count, as the envelopes are received by the receiving rolls and passed therethrough, we provide a pawl clutching mechanism, shown more clearly in Figs. 2, 6, and 7. As before stated, the bevel gear, 18, is loosely mounted upon the shaft of the clutch roll, 19, and has on its outer end an annular flange provided with a notch, $18^c$, normally engaged by the pawl, 9, mounted upon the shaft of the roll, 8, between the two portions thereof, thus being held normally against rotation. One end of this pawl, $9^a$, projects slightly beyond and below the line of contact between the rolls, 7 and 8, and it is so balanced that as the envelope falls, from the machine above, between the two rolls, it strikes the end, $9^a$, and as the envelope is gripped by the rolls, it forces down the end of the pawl, thereby disengaging the pawl from the bevel gear, 18, as the envelope is gripped by and drawn between the rolls, 7 and 8. In the face of this gear, 18, is a groove, $18^a$, provided with a pin, $18^b$, or suitable shoulder equivalent thereto. Working in a recess in the clutch roll, 19, is a plunger, $19^a$, normally pressed outwardly by a spring, $19^b$, on one side of which plunger is a shoulder or recess in contact with pin, $19^c$, adapted to limit the outward movement of the plunger so as to keep the point thereof slightly away from the bottom of the groove, $18^a$, in the hub of the gear, 18. It will be seen that the end of this plunger is pointed and projects normally within the groove, $18^a$, so that as the roll, 19, rotates continuously with the shaft, the pointed end of the plunger will travel in the groove and in each rotation will come in contact with the pin, or shoulder, $18^b$, and will slide over the said shoulder as long as the gear, 18, is held from rotation by the pawl, 9. While the envelope, however, is passing between the rolls, 7 and 8, the pawl will be raised and held out of engagement with the tooth, 18$^c$, thus permitting the plunger, 19$^a$, to engage and clutch the shoulder or pin, 18$^b$, the spring, 19$^b$ being of just sufficient strength to prevent the said shoulder or pin from pushing the plunger back into its recess when the pawl does not hold the hub against rotation. The gear, 18, and the roll, 19, will thus be locked together and will rotate in this manner until the envelope has passed between the rolls, releasing the pawl, 9, which drops down again and engages the hub, the latter of which rotates continuously while the envelopes are fed regularly, but if the feed is not regular, during such time the hub will be held against rotation. The cycle of operation is repeated, as each envelope passes between the receiving rolls; one to each revolution of the roll, 19. By this means, it will be seen, that the gear, 18, will make one revolution each time an envelope passes between the rolls, 7 and 8, and the gear, 17, with its tooth, 10, will likewise be rotated once at such passage of an envelope.

Figure 8:
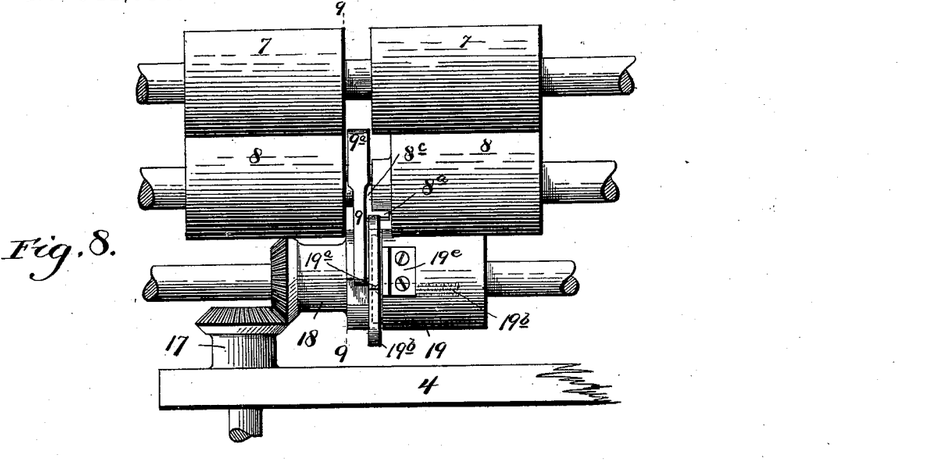
Figs. 8, 9, and 10 are details of a modification of the pawl mechanism, Fig. 9 being a section on the line 9 9, Fig. 8.
Figures 9, 10, 11:
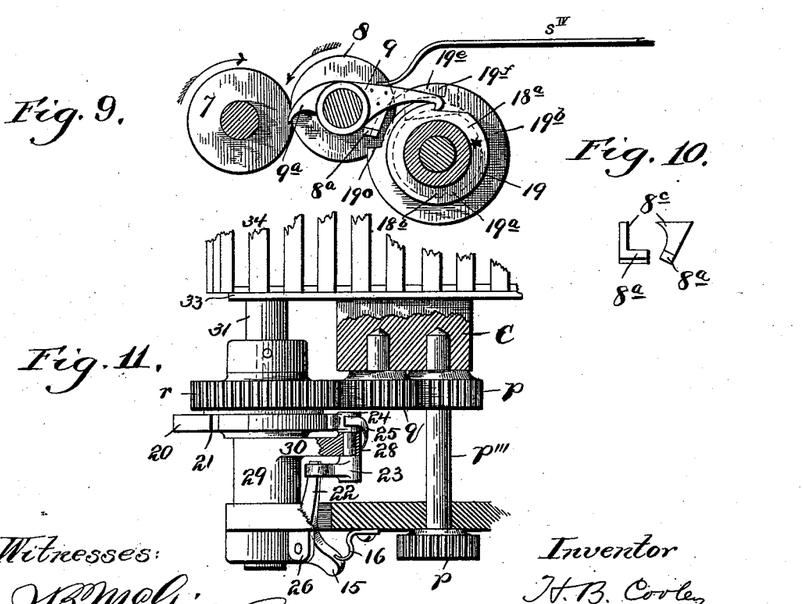
Fig. 11 is a detail of the mechanism for causing the chain to move one section at a time.
Figure 12:
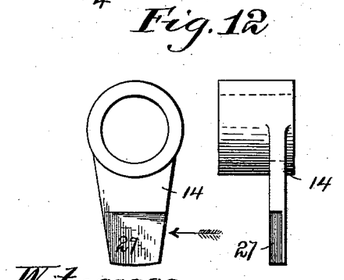
Fig. 12 is a detail, in side and front views, of the side cam thereof.

To secure a positive action for lifting the pawl, 9, and to prevent the possibility of the point, 9$^a$, scratching or tearing the envelope as it passes through the rolls, we prefer to employ the modification shown in Figs. 8 to 10, in which the pawl mechanism is made positive in its lifting action and is so timed that it cannot possibly scratch or tear the envelope in its passage through the rolls. In this modification there is mounted upon the roll, 19, a land, 19$^d$, the forward end of which is indicated by 19$^c$, and the rear end, by 19$^f$. Secured to the roll, 19, against and overlapping the rear end of this land is an angle iron or lug, 19$^e$, the forward end of which lies between the two ends of the land; and upon the arm of the pawl, 9, is suitably secured a cam block, 8$^c$, having a tappet arm, 8$^a$, projecting downwardly from the side of the pawl in line of travel of the land, 19$^d$, and the lug, 19$^e$. A spring $s^{IV}$, is attached to the frame at a suitable point and bears down upon the pawl, 9 so as to keep it in engagement with the hub of the gear, 18. By this construction, as the roll, 19, rotates, the forward end of the lug, 19$^e$, will come in contact with the tappet, 8$^a$, on the pawl, raising the same against the pressure of the spring and if there is an envelope passing between the rolls, 7 and 8, the entering edge of it will have passed a short distance beyond the depressed end, 9$^a$, of the pawl, before the tappet is released by the lug, 19$^e$, and the pawl end for this distance will be out of contact therewith. The rear end of the lug, 19$^e$, then passes from under the other end of the pawl which will then drop off of the same throwing the end, 9$^a$, of the pawl in contact with the envelope, thus preventing the pawl from engaging, at this time, the tooth, 18$^c$, on the hub of the gear, 18. At this time, the plunger, 19$^a$, is about in position shown by the star, Fig. 9, and further revolution of the shaft will bring this plunger in contact with the pin, 18$^b$, in the groove, 18$^a$, thereby locking the gear, 18, and the roll, 19, together. The further rotation of the roll, 19, will bring the forward end, 19$^c$, of the land, 19$^d$, in contact with the tappet, 8$^a$, just when the envelope remains a short distance between the rolls, 7 and 8, thereby raising the pawl, 9, slightly and releasing the pressure of the end, 9$^a$, on the envelope as the envelope leaves the receiving rolls. Inasmuch as the hub of the gear, 18, is loosely mounted on the shaft, it will be seen that if no envelope passes through the rolls, the pawl will be lifted by the lug, 19$^e$, as described and dropped back in engagement with its notch, 18$^c$, thus preventing a count being made when no envelope passes through. It will be further observed that the envelope is permitted to enter between the rolls a short distance before the pawl comes in contact therewith, and that the latter is lifted out of contact with the envelope just before the envelope passes from the receiving rolls, so that there is no liability whatever of the edge of the envelope being torn or scratched as it passes through. The lifting action of the pawl is thus rendered positive; and there can be no count, with either construction, unless an envelope passes between the receiving rolls. For these reasons, therefore, we consider the construction just described, and illustrated in Figs. 8 to 10, as the preferable pawl mechanism.

Figure 13:
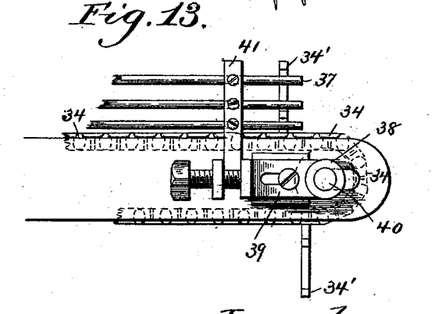
Fig. 13 is a detail of the adjustable bearing for one of the chain-sprockets.
Figure 14:
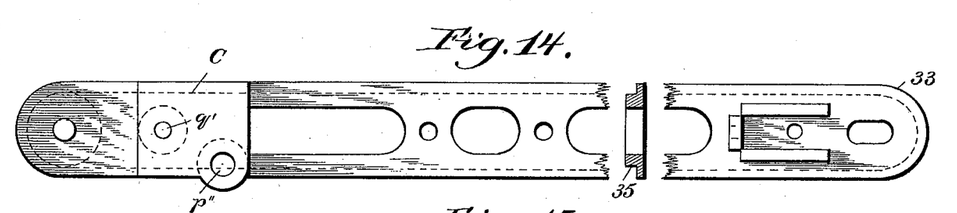
Figs. 14 to 19 are details of the chain structure.
Figures 15, 16, 17, 18, 19:
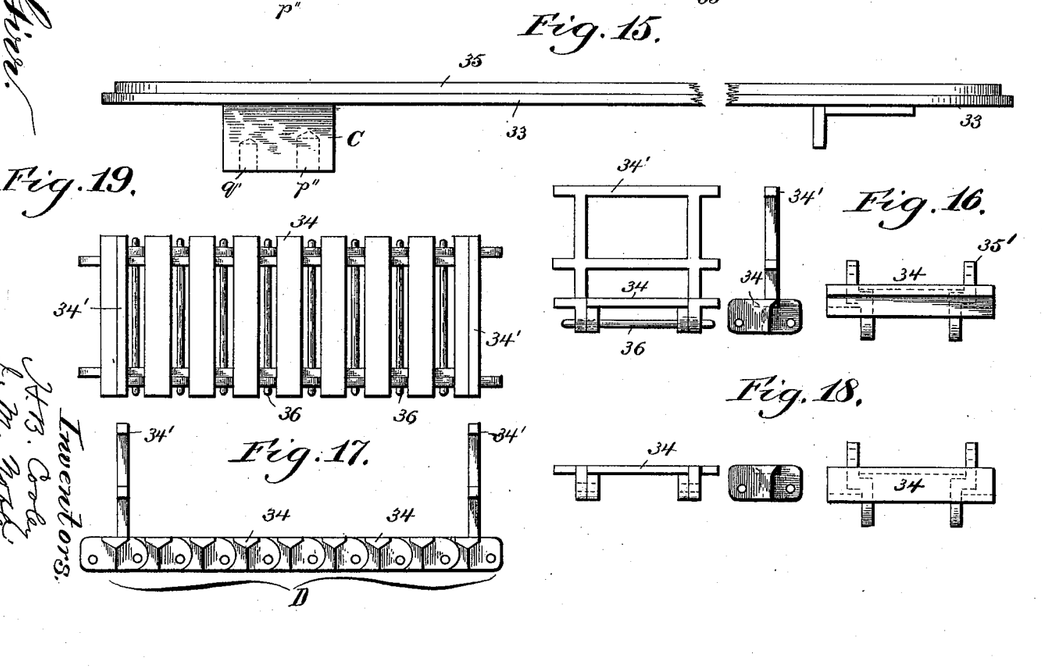

We will next describe the mechanism whereby the envelopes are pushed into the appropriate section in the delivery chain after they are dropped from the receiving rolls, and also the mechanism for packing and retaining the said envelopes in the proper position upon the chain. This mechanism is more clearly shown in Figs. 1, 2, 4, 5, and 23, where it will be seen that the chain structure is attached to the frame, 4. The side rods, 37, of this structure are for the purpose of guiding and retaining the upper parts of the sections, D, Fig. 17, of the chain and the envelopes contained therein. Suitably bolted to the main frame are the frames, 33, provided with the guideways, 35, Figs. 14 and 15, upon which guideways, the pintles, 36, connecting the links, 34, of the chain, are adapted to slide. Each link of the chain is formed of a flat upper face with two Z-shaped lugs, 35', projecting from the lower side thereof through which lugs the pintles, 36, pass to connect the separate links together, an upright, 34', being formed on the links at the end of each section, between which the envelopes are held. Passing through one end of the frames, 33, is a shaft, 31, journaled in the frames, 4, upon which a suitable sprocket wheel, 32, is mounted for giving motion to the chain. In the other end of said frames, 33, near the outermost side of the table, 3, we provide another sprocket, 40, Fig. 13, around which the chain travels. This sprocket is preferably mounted in an adjustable bearing block, 39, which is provided with a journal, 38, in which the shaft of said sprocket rotates. Each of the frames, 33, is slotted to allow for the longitudinal movements of the shaft of the sprocket when adjusted and the bearing block, 39, is provided with similar slots having a binding screw therein, the end of the block being in contact with an adjusting screw bolt which passes through a lug cast on the side of the frame, 33, in contact with a fixed post, 41, which forms a support for the guide wires, 37. By this means any slack in the chain can be readily compensated for by easing up the screw on the bearing block and screwing the adjusting bolt so as to move the journal bearing, 38, of the sprocket, 40, farther away from the bearing of the sprocket, 32. We show this means of adjustment as convenient and simple, but it is to be noted that any ordinary adjustable bearing may be used for this purpose.

It will be observed that the chain travels alongside of the table, 3, over the shelf, 3', which is below the top of the table so as to bring the top of the sections, D, slightly above the table, 3. The inside rods, or guide wires, 37, extend within a short distance of the line of travel of the envelopes, while the outside rods, 37, as shown in Fig. 2, extend preferably to a point nearly in line with the center of the receiving rolls, opposite to which the center of each section, D, is adapted to be held while the envelopes are being pushed within the same.

Projecting from the frame, 4, below the receiving rolls are two cross head guides, 59, forming ways upon which tubular cross heads, 61, are adapted to slide between which guides the envelope is dropped from the receiving rolls, striking guide plates, 62, the lower edge of the envelope finally resting upon the bottom plate, 63, attached to the block, C. This block, C, is bolted to the inside frame, 33; and carried by the tubular cross heads, 61, is a plate, 60, which is adapted to push the envelope across the bottom plate, 63, into the section, D, of the chain. This pusher plate is reciprocated by a bell crank lever, fulcrumed upon a pin, 68, attached to the frame, 1, of the machine, and passing through the sleeve, 69, of said lever; and one arm, 64, of this lever has a slotted connection with the tubular cross heads, 61, the other arm, 65, being provided with a friction roll, 66, held normally in contact with a cam, 67, on the main shaft, 2, by means of a spring, $s''$, tied to the frame of the machine. Fig. 23 shows a front view of the head, 60, which is provided with notches on its upper edge to clear the fingers, 52, when the latter are projecting through the plate, 42, bringing them below the upper edge of the said pusher head. This cam, 67, is so timed that as the envelope is discharged from the receiving roll and falls upon the bottom plate, 63, in upright position, it will permit the spring, $s''$, to pull the arm, 64, toward the chain structure, thereby moving the pusher head or plate across the vertical path of the envelope in its course downward from the receiving rolls, thus pushing the said envelope into the section, D, of the chain.

The envelopes are retained on edge in an upright position by the end frames, 34', and the finger, 56, pivotally supported upon the buffer, 55, so as to swing in the direction of travel of the chain, a spring, $s'''$, being confined between the buffer and the bottom of the chamber, 57, in which chamber a stud, 55', works, one end of said stud being secured to the buffer, which, in the present instance, is a bar, 55. The finger, 56, is pivoted upon such end of this stud, in a slot in the buffer, 55. This buffer is shown as supported by the central stud, 55', and by similar guiding studs, 55', at each end of the buffer, and passing through the frame, 4, into chambers 57', the latter of which may be perforated bosses upon the frame, or provided with bottoms as desired. Additional guiding studs, 55'', attached to the buffer, 55, and passing through hubs in the frame, 4, may also be employed.

Instead of using a single buffer bar or plate, as 55, it is obvious that two or more studs, 55', each provided with a finger, 56, and a spring $s'''$, may be employed, in which case a chamber, 57, would be used for each stud; or such chambers may be dispensed with and the spring or springs secured at the outer ends directly to the frame 4; but we prefer the particular construction shown.

In order to prevent the envelope from falling forward after the pusher plate recedes, we provide mechanism which is shown in Figs. 2, 3, 4, and 5, and more in detail in the latter figure. Above the buffer, 55, a plate, 42, is secured to the side frame extending between the cross bars, 5 and 6, underneath the roll, 7, thus protecting the envelopes, which are being loaded upon the chain below, from dust, oil, &c. This plate is provided near each end with journal bearings, 43, in which is journaled the shaft, 44, preferably square in cross-section, to which shaft are attached arms, 54, each carrying a downwardly projecting finger, 52, the said arms being preferably connected to the under side of the shaft, 44, by a transverse piece, 54', which comes directly under a slot in the plate, 42, so as to afford sufficient space for the oscillation of the shaft, 44, and the consequent movement of the connecting piece, 54', as shown in Figs. 2, 4, and 5, and more in detail in Fig. 24. Connected to an arm, 45, on the outer end of this rock shaft, by a slotted connection, 49, is a lever, 46, pivoted at 48, the other arm of which lever is provided with an upward bevel projection, 47, which is adapted to be engaged by a pin, $t$, carried by a plate, T, secured to the face of the gear, $m$. This lever, 46, is connected to a fixed part of the machine by an upwardly extending spring, $s'$, which normally tends, when the bevel projection is not in contact with the pin, *t*, to depress the arm, 45, of the rock shaft, thereby normally holding the fingers, 52, downward, the lower ends of which extend slightly below the top of the envelope, thus preventing the envelopes from falling forward and confining them between the buffer and the pivoted arm or arms and the said fingers. Now it is to be observed that the pin, *t*, is so timed in its revolution with respect to the movement of the pusher plate, 60, that it comes in contact with the beveled projection on the lever, 46, in time to raise the fingers out of the way of the plate so as to allow it to push the envelope well into the section of the chain. The pin, *t*, releases the lever, 46, as the said pusher plate recedes, thus allowing the fingers to be pushed downward in place to hold the envelopes. By this mechanism, the envelope is always kept on edge and the pressure exerted by the buffer upon the back of the package, which is being formed, is just sufficient to keep the envelope in a compact upright position within the chain section. The plate, 63, is above the level of the chain so as to hold the bottom of the envelopes in place. This plate, it will be observed, is at right angles to the movement chain and its structure.

After the section is filled with a package, in the present instance, of fifty envelopes, it is necessary to move the chain just one section; and to do this in time for the next succeeding section to be in position to receive the first of the next package of envelopes from the pusher plate, we provide the mechanism shown more clearly in Figs. 2, 3, 4, 11, and 12. Referring now particularly to these figures, 29, indicates a hub fixed to, and adapted to rotate with, the shaft, 31, and provided with an arm, 30, projecting therefrom. *r*, indicates a spur gear loosely mounted upon the shaft, 31, to the side of which is fixed a disk, 20, provided with a single ratchet tooth, 21. The gear, *r*, and the disk connected thereto are continuously rotated upon the shaft, 31, this gear receiving its motion from the idler gear, *q*, mounted upon a spindle on the block, C, and meshing with a spur gear, *p*, on one end of the shaft, *p'''*, which carries at its outer end outside of the frame, 4, a gear, *p*, the latter receiving motion through the train composed of the gear, *o*, meshing with the gear, *e*, on the hub of the bevel gear, *d*, which meshes with a bevel gear, *c*, carrying a spur gear, *b*, in mesh with the large spur gear, *a*, on the main shaft, 2, of the machine. It will thus be seen that the spur gear, *r*, with its disk, 20, is continuously rotated through the train connecting it with the main shaft, the said gear, *r*, being so timed as to make two revolutions to one of the clutch roll, 19. The rolls, 7 and 8, through the train of gears, previously described, are likewise continuously rotated and it is now in order to describe the mechanism by which the disk, 20, is clutched to the shaft, 31, so as to move the chain one section when said section has been filled with a predetermined number of envelopes forming a package.

In the outer end of the arm, 30, is journaled a spindle, 28, carrying, on one end, a pawl, 24, Figs. 2 to 11, adapted to engage the tooth, 21, on the disk 20, toward which it is normally pressed by a spring, 25, and on the other end, a tappet arm, 23, whose upward movement is limited by a stop pin, 58. Whenever therefore the pawl, 24, is caused to engage the tooth, 21, of the disk, 20, it will be seen that the arm, 30, and the disk will be locked together so that the arm will rotate therewith, thus turning the shaft until the pawl 24, is disengaged, unlocking the connection between the said arm and the disk carried by the gear, *r*. To accomplish this locking and unlocking of these two parts together so as to rotate the shaft to move the chain one section, we provide suitable mechanism between the last gear of the counter train and the tappet lever, 23. Fulcrumed to lugs, 26, on the frame, 4, is a trigger in the form of a bell crank lever having one arm, 22, projecting through a slot in the frame and engaging the tappet, 23, the other arm, 15, being in engagement with a spring, 16, so that the tappet, 23, with which the arm 22, is in contact, is normally held upward, thus keeping the pawl, 24, out of contact with the disk, 20. Mounted upon the bushing of the five tooth gear, 13, is an arm, 14, having a side cam, 27, which consists of an inclined surface or recess running across the face of the said arm and is adapted to engage, at the proper time, the arm, 15, of the trigger to force it inward toward the frame of the machine against the action of the spring, 16, thereby depressing the other arm, 22, of said trigger and permitting the spring, 25, to throw the pawl, 24, against the edge of the disk, 20, thus causing the said pawl to drop into the tooth, 21, when the latter is brought under same by the further revolution of the said disk. By this means the disk and arm, 30, are locked together and the shaft, 31, is consequently turned thereby moving the chain the length of the section, D. It will thus be seen that each revolution of the arm, 14, which is placed upon the shaft slightly in rear of one of the teeth of the five tooth gear, 13, gives enough motion to the side cam thereon as to carry it into contact with and past the trigger so as to effect the clutching or locking of the disk, 20, and the arm, 30, together, and allowing the trigger to spring back into place after the clutching is effected and the shaft, 31, moves the chain one section, whereby the said trigger will be in position to release the pawl, 24, from the disk, 20, when the tappet, 23, comes in contact with the arm, 22, of the said trigger upon the completion of the movement of the chain section. It will thus be observed that a positive means is provided for turning the shaft, 31, so as to move the chain the length of the section, D, when a predetermined number of envelopes forming the package has been loaded thereon. We should observe that the counter gears and the arm, 14, having the side cam thereon, are all preferably mounted upon sleeves so that they can be readily and accurately adjusted with respect to one another upon their respective shafts.

From the foregoing description, the operation of the machine will be readily understood. It will be sufficient to note that as the envelopes are passed between the receiving rolls, the pawl mechanism is operated to lock the continuously rotated roll, 19, with the bevel, 18, which meshes with the primary gear, 17, of the counter train on which the one tooth gear of the said counter is secured, a single revolution of the said one tooth gear, 10, at the passage of an envelope through the receiving roll thus counting one envelope at a time. The one tooth gear moves the train of counters, 11, 12, and 13, constructed to count any desired number according to the number of teeth used, in the present instance, fifty, and upon the completion of the count of a designated number, the trigger mechanism is operated by the side cam mounted on the shaft of the last counter gear in the train to lock the revolving disk, 20, and the arm, 30, fixed to the shaft, 31, thus rotating the said shaft and causing it to move the chain one section at a time; and upon the completion of which movement the trigger, having been released by the side cam, is in position to unlock the arm, 30, and the disk, 20, the former remaining stationary until another package of envelopes has been completed when the cycle of operations is repeated.

While we have described and shown the preferable construction for causing the envelope to set in motion the mechanism for operating the counter train, it is to be understood that this mechanism may be varied within the spirit of our invention; and that the mechanism for pushing the envelopes upon the chain with the mechanism for intermittently operating the latter may likewise be varied within the scope of our invention, and changes in other parts of the counter mechanism and chain may be made without departing from our invention, which consists essentially in mechanism for positively operating the counter depending upon the passage of the envelope through a pair of receiving rolls, and in the mechanism for moving the chain one section at a time when a predetermined number of envelopes have been placed thereon; and it further consists in the combination of the intermittently operated chain, a counter train, the receiving rolls, and clutching mechanism between the receiving rolls and the counter train controlled by the passage of the envelope between said rolls; and it should be further observed that the relative arrangements of the parts may be changed to suit varying circumstances, and to adapt the device to other forms of machines, without involving a material departure from our invention.

We claim as our invention—

1. In an envelope or analogous machine, the combination of a chain composed of a series of sections adapted to receive the envelopes as they are discharged from the machine, mechanism for moving said chain, and mechanism controlled by the envelopes as they are discharged from the machine to cause the chain to move one section at a time when a predetermined number of envelopes have been received by said section, substantially as specified.

2. In an envelope or analogous machine, the combination with mechanism for receiving the envelopes from the machine, and mechanism for placing said envelopes upon a chain, of a chain composed of a series of sections, and means controlled by the envelopes for moving said chain one section at a time intermittently when a predetermined number of envelopes have been placed thereon, substantially as described.

3. The combination with an envelope or analogous machine, of a chain composed of a series of sections, mechanism for receiving envelopes from the machine and discharging the same downwardly, mechanism operating across the path of the envelopes for pushing the said envelopes one at a time upon a section of the chain, and means for moving said chain a section at a time when a predetermined number of envelopes have been placed upon said section, substantially as described.

4. The combination with an envelope or analogous machine, of receiving rolls between which the envelopes are passed, a counter train normally out of gear with said rolls, mechanism for automatically throwing said train in gear with the rolls when an envelope passes between them, a chain comprising a series of sections adapted to receive the envelopes, and mechanism between the chain and the receiving rolls for pushing the envelopes one at a time upon the sections of said chain, with mechanism, controlled by the counter train to cause the chain to move one section at a time as a predetermined number of envelopes is placed on said section, substantially as described.

5. The combination with an envelope or analogous machine, of the main driving shaft, the receiving rolls through which the envelopes are passed downwardly from the machine, connections between said driving shaft and rolls for continuously rotating the same, a counter train normally at rest, connections between the receiving rolls and counter train adapted to be put in operation by the envelope as it passes through the rolls, whereby the counter train is operated to count each time an envelope passes between the rolls, substantially as described.

6. In an envelope or analogous machine, the combination with a chain and mechanism for automatically moving said chain step by step when a predetermined number of envelopes has been placed thereon, of the receiving rolls journaled in bearings below the delivery of the machine, a shaft journaled in bearings adjacent thereto, connections between the main driving shaft and receiving rolls for continuously rotating the same, a bevel gear loosely mounted on said shaft, pawl mechanism carried by the shaft of one of the receiving rolls normally holding said gear against rotation, locking device between the gear and its shaft, and means for causing said locking device to lock the gear and shaft together as an envelope passes between the receiving rolls, a counter train, and connections between said counter train and gear, whereby the said counter train may be caused to count each envelope as it passes between the rolls, substantially as described.

7. In an envelope or analogous machine, the combination with the main frame, of a supplemental frame attached thereto below the delivery of the machine, the receiving rolls mounted in said supplemental frame, connections between the driving shaft and said receiving rolls for continuously rotating the same, a shaft journaled in said supplemental frame adjacent to the receiving rolls in gear therewith, a clutch roll fixed to said shaft, a bevel gear loosely mounted on the shaft with its hub in contact with the clutch roll and provided with a groove therein, a stop pin or shoulder in said groove, a recess in the clutch roll, a spring actuated plunger in said recess having its outer end traveling in the groove in the face of the hub of the gear, a pawl journaled upon a shaft of one of the receiving rolls and projecting slightly beyond the line of contact of the two receiving rolls and normally engaging a tooth on the gear to hold it against rotation, means for disengaging said pawl from the gear and holding it out of engagement therewith as the envelope passes between the rolls, so that the spring actuated plunger may engage and remain in contact with the pin or shoulder of the groove of said gear thereby locking the gear and clutch roll together, a counter train, connections between said counter train and gear, whereby the former is caused to move each time an envelope passes between the rolls, substantially as described.

8. In a counter for envelope or analogous machines, the combination with the receiving rolls through which the envelopes pass, of a clutch roll mounted on a shaft adjacent to said rolls and rotating continuously therewith, an interrupted flange on said roll forming a land, a cam projection upon the roll between the ends of the land having its upper surface in line with the upper surface of the land, a spring actuated plunger in the body of the roll with its end projecting beyond the face thereof, a pawl fulcrumed upon the shaft of the receiving roll adjacent to the clutch roll with one end projecting slightly beyond the line of contact between the two receiving rolls, a gear loosely mounted upon the same shaft with the clutch roll, normally held against rotation by said pawl, a tappet projecting from the pawl in the path of the ends of the land and cam on the clutch roll, a groove in the face of the hub of the gear with a shoulder or stop therein, in which groove the end of the plunger travels in the rotation of the roll, said stop pushing the plunger into its recess when the gear is held against rotation and locking the gear and roll together when the gear is released by the pawl, substantially as described.

9. In a counter for envelope or analogous machines, the combination with the receiving rolls between which the envelopes pass, of a shaft adjacent to one of the rolls, a clutch roll fixed to said shaft, a gear loosely mounted on said shaft with its hub in contact with the clutch roll, a pawl mounted on the shaft of one of the receiving rolls with one end projecting slightly beyond the line of contact of said rolls and normally holding the gear against rotation, a cam on the clutch roll for raising the pawl to throw its end out of line with the envelope as it enters between the receiving rolls, and permitting the pawl to drop until its end engages the envelope after it has cleared the edge thereof thus holding the said pawl out of engagement with the gear, means for locking the clutch roll and gear together in the further rotation of the roll, whereby the gear is caused to make one revolution as the envelope passes between the receiving rolls, and means for raising the pawl out of contact with the envelope to clear the edge thereof as it drops from the receiving rolls and to cause the pawl to engage the gear and lock the same against rotation when the envelope is passed from the receiving rolls, substantially as described.

10. The combination with an envelope or analogous machine, of the receiving rolls between which the envelopes are passed, a counter train normally out of action, mechanism directly controlled by the passage of the envelopes between the receiving rolls for connecting the said rolls with the counter train, whereby a count is made only when an envelope is passed between the rolls, substantially as described.

11. The combination with an envelope or analogous machine, of the receiving rolls, each consisting of two parts with a space between said parts, a pawl fulcrumed upon the shaft of one roll within the space between its two parts, and having one end projecting within the space between the two parts of the other roll and beyond the line of contact between the rolls, a counter train, clutch mechanism between said train and the receiving rolls normally held out of action by the pawl, and thrown into action by passage of an envelope between the receiving rolls, substantially as described.

12. The combination with an envelope or analogous machine, of the receiving rolls, a clutch roll adjacent to a bevel gear loosely mounted upon the same shaft with said clutch roll, mechanism for locking the said gear and clutch roll together as an envelope passes between the receiving rolls, a counter train comprising a series of gears intermittently intermeshed with the clutch roll by the said bevel gear, and springs bearing upon the driven gears of the counter train to bind them against their bearings, whereby said driven gears may be prevented from moving more than one tooth at a time, substantially as described.

13. The combination with an envelope or analogous machine, of the receiving rolls, connections between said rolls and a rotating part of the machine, a clutch roll mounted on a shaft adjacent to said receiving rolls so timed as to make one revolution to two or more revolutions of the receiving rolls, a bevel gear on the same shaft with the clutch roll, a pawl normally holding said gear against rotation, and having one end projecting beyond the line of contact of the receiving rolls and in line of the travel of the envelope through said rolls, a counter train in mesh with the bevel gear, connections between the clutch roll and bevel gear adapted to lock the said parts together when the pawl is released from the gear by the envelope passing between the rolls, substantially as described.

14. In a counter for envelope or analogous machines, the combination with the receiving rolls through which the envelopes pass, of a counter train, a gear mounted on the shaft between said counter train and receiving rolls and normally held against rotation, a pawl fulcrumed on the shaft of one of the rolls adapted to hold said gear against rotation having one end projecting beyond the line of contact of said rolls, mechanism for positively raising said pawl to clear the edge of the envelope as it enters between the receiving rolls, and immediately releasing the same to bring it into contact with the envelope passing between the rolls to hold the pawl out of engagement with the gear, a clutch device fixed to and rotating with the shaft of the gear, adapted to lock the gear to the shaft when the pawl is out of engagement therewith, and means for positively lifting the pawl out of engagement with the envelope to clear the edge as it leaves the rolls and release the pawl to engage the gear to hold it against movement when an envelope fails to pass through the receiving rolls at the proper time, substantially as described.

15. In a counter for envelope or analogous machines, the combination with the receiving rolls, of a counter train, connections between said receiving rolls and the train controlled by the envelope passing through the rolls to transmit motion from the said rolls to the counter train only when an envelope passes between said receiving rolls, a chain below the receiving rolls, means for pushing the envelopes upon said chain successively, and means for moving said chain, with connections between the counter train and the operating means for the chain arranged to move the chain one section at a time upon the completion of a package of envelopes of a predetermined number, substantially as described.

16. The combination with an envelope or analogous machine, of the receiving rolls through which the envelopes pass, a counter train, connections between the receiving rolls and the counter train, normally out of action and set in motion by the passage of envelopes between the receiving rolls to cause the train to count one envelope at a time, a shaft journaled below the receiving rolls, a chain operated by said shaft, means for pushing the envelopes upon said chain as they fall from the receiving roll, a gear loosely mounted on said shaft, connection between said gear and an operating part of said machine for continuously rotating the same, an arm fixed upon said shaft and a clutch between the gear and said arm normally out of action, with connections between said clutch device and the counter train adapted to throw the clutch device in action and lock the gear to the shaft upon the completion of the count of a predetermined number of envelopes by the train, substantially as described.

17. In a counter for envelope or analogous machines, the combination with a counter train, of a chain comprising a series of sections, of a shaft for operating the chain, a gear loosely mounted on said shaft, an arm fixed to said shaft, a disk fixed to the gear and rotating therewith, a spindle journaled on said arm having a locking pawl held normally out of engagement with the disk, and a tappet arm on the opposite end thereof, a spring actuated bell crank lever mounted upon the frame of the machine with one arm normally in contact with the said tappet thereby holding the pawl out of engagement with the disk, an arm on the shaft of the last gear of the counter train provided with a side cam rotating in the path of the other arm of the bell crank lever adapted to move the same to release the tappet arm, upon the completion of a revolution of the last gear in the counter train, substantially as described.

18. The combination with an envelope or analogous machine, of the supplemental frame secured to the main frame below the delivery of the machine, the receiving rolls through which the envelopes are passed, a counter train, mechanism between the receiving rolls and train for causing the latter to count one envelope at a time as the envelopes pass between the receiving rolls, a chain below the receiving rolls composed of sections adapted to receive each a package of envelopes of a desired number, a shaft for operating said chain held normally against rotation, a clutch disk loosely mounted upon said shaft, connections between said disk and the main shaft of the machine for continuously operating the same, an arm fixed to the shaft, a pawl carried thereby, a bell crank lever fulcrumed upon the frame with one arm projecting through a slot in the same and adapted to hold the pawl out of engagement with the rotating disk, a cam carried by the sleeve of the last gear of the counter train arranged to engage the other arm of the bell crank lever and force it down to release the pawl and permit it to lock the arm and disk together, whereby the said arm may make one revolution to move the chain one section, substantially as described.

19. The combination with the receiving rolls from which the envelopes are discharged downwardly, of the bottom plate or table upon which they fall, the chain comprising a series of sections adapted to be held in position to receive the envelopes, means for intermittently moving the chain at right angles to the table, the reciprocating pusher plate below the receiving rolls, and connections between the pusher plate and the main driving shaft for reciprocating the same, whereby the envelopes are successively pushed into the chain, substantially as described.

20. The combination with the receiving rolls through which the envelopes are passed, the bottom plate or table below the receiving rolls upon which envelopes fall, and the main driving shaft, a cam thereon, a bell crank lever fulcrumed to the frame of the machine having one arm held in contact with said cam, a pusher plate connected to the other arm of the bell crank lever located below the receiving rolls, a chain upon which the envelopes are to be placed adapted to be held with a section opposite the pusher plate, and means for moving said chain intermittently at right angles to the table, whereby the envelopes are pushed successively into a section of the chain, substantially as described.

21. The combination with an envelope or analogous machine, of the receiving rolls through which the envelopes are passed, the table upon which the envelopes fall, the chain supporting structure comprising the frames having guide ways thereon secured to the machine, at right angles to said table, the chain composed of a series of links each having Z-shaped lugs, and pintles passing through said lugs connecting the separate links together, the ends of said pintles resting upon the guide ways on the frames, and sprocket wheels around which the chain passes, with means for pushing the envelopes upon the chain and means for moving said chain, substantially as described.

22. The combination with an envelope or analogous machine of a mechanism for discharging the envelopes downwardly, a table upon which the envelopes fall, a chain comprising a series of sections formed of a plurality of links hinged together, frames for guiding said chain, a driving shaft mounted in bearings upon the machine, a sprocket wheel on said shaft between the frames of the chain structure, a second sprocket wheel mounted in adjustable bearings on the said frames, with means for rotating the said shaft to move the chain at right angles to the table, substantially as described.

23. The combination with receiving rolls, of a counter mechanism for envelopes or analogous machines, the table or bottom plate upon which the envelopes fall from the rolls, the pusher plate reciprocating below the receiving rolls across the path of the envelope, a chain upon which the envelopes are pushed, mechanism for operating the pusher plate, a spring buffer having a pivoted finger depending therefrom against which the envelopes are pushed, and the rock shaft mounted above the chain provided with fingers projecting normally below the top of the envelope in line therewith, with means for vibrating said rock shaft to raise the finger out of the path of the envelope and lower the same after the envelope is pushed on the chain to confine the same within the chain, substantially as described.

24. In an envelope or analogous machine, the combination with the chain, the receiving rolls and the mechanism for pushing the envelopes upon the chain, of the means for holding and retaining the envelopes in upright position in the chain while being loaded, consisting of the spring buffer with a pivoted finger against which the envelopes press on one side, a rock shaft mounted above the chain provided, with fingers adapted to engage the upper part of the other side of the envelope, and means for intermittently vibrating said shaft to raise the said fingers out of the path of the envelopes as they pass to the chain, substantially as described.

25. In an envelope or analogous machine, the combination with the chain and the mechanism for loading the envelopes upon the chain, of the buffer against which the envelopes press on one side, a rock shaft mounted above said buffer provided with downwardly projecting fingers adapted to hold the envelopes in upright position, a lever fulcrumed to a fixed part of the machine having a slotted connection to an arm on the rock shaft, a spring normally holding the other arm of said lever upward thereby depressing the fingers thereon, a pin carried by a rotating part of the machine arranged to engage the other arm of the lever so as to depress the same as each envelope is loaded upon the chain, thus raising the confining fingers out of the path of said envelope and lowering the same to hold the envelope in position, substantially as described.

In testimony whereof we have signed our names to this specification in the presence of two subscribing witnesses.

HENRY BUCKLEY COOLEY.
   JOHN MADISON NOBLE.
   JAMES EDWARD TREVOR.

Witnesses:
 JOHN DANBY,
 ALBERT W. GRAY.